Figure 1:
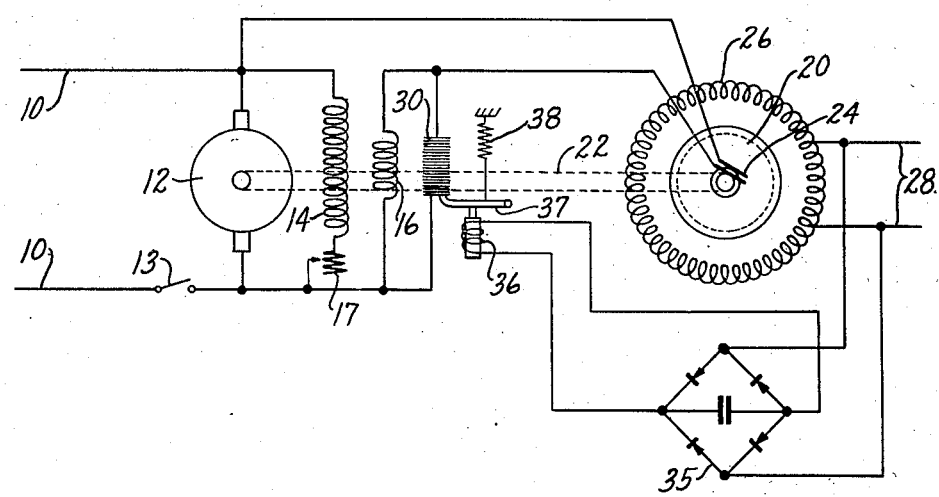

Aug. 21, 1945.  T. W. MOORE  2,383,143

REGULATING MECHANISM

Filed Aug. 15, 1942

Inventor
Thomas W. Moore

By Marechal & Noe
Attorneys

Patented Aug. 21, 1945

2,383,143

UNITED STATES PATENT OFFICE 2,383,143

REGULATING MECHANISM

Thomas W. Moore, Dayton, Ohio, assignor to The Leland Electric Company, Dayton, Ohio, a corporation of Ohio Application August 15, 1942, Serial No. 455,011

6 Claims. (Cl. 171—119)

This invention relates to electrical control systems adapted to regulate the output of dynamoelectric machines.

It is the principal object of the invention to provide a control system for a motor driven generator which serves to maintain the driving speed and the generated voltage within predetermined limits under widely varying conditions of voltage of the supply source and of load on the generator.

It is a further object to provide a control system in which a single control operation is utilized to maintain accurate control over the generated frequency and voltage of a motor driven alternator.

It is a still further object to provide such a control which is small, and light in weight and adapted for the regulation of the alternating current power supply which is utilized on aircraft and for similar purposes.

Further objects and advantages will be apparent from the following description, the accompanying drawing and the appended claims.

Figure 2:
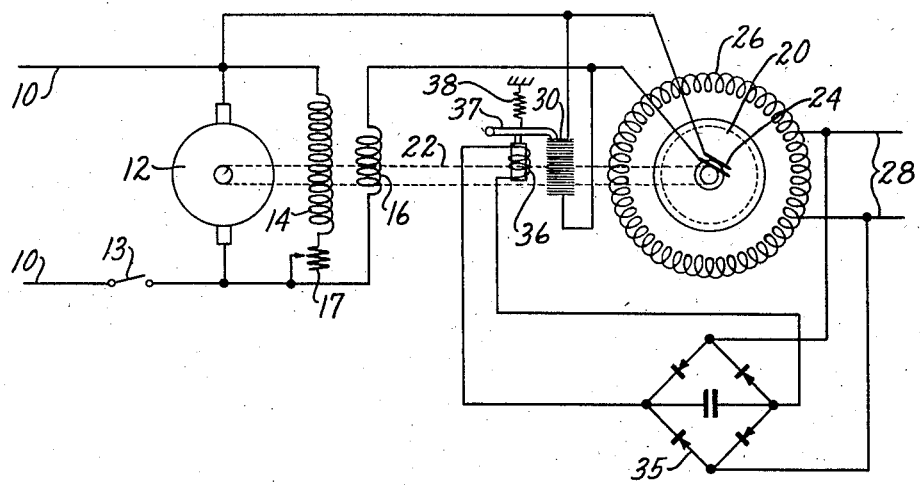

In the drawing,

Fig. 1 is a diagrammatic showing of the circuit arrangements forming the control system of this invention; and Fig. 2 is a similar view of a modified arrangement.

The present invention is adapted for use as a control for a motor generator or motor alternator wherein it is desired to maintain control in a simple and effective manner over both the speed of operation and the voltage of the generator. In the field of aircraft it is particularly desirable to have a control system which combines the advantages of simplicity, lightness in weight and reliability of regulation over substantial variations in loading and in the voltage of the supply source. The present invention is especially adapted for such use where the drive motor operates from a relatively low voltage source of direct current and the generator is a high frequency alternator, and for purposes of illustration will be hereinafter described in that relation.

In the drawing which discloses a preferred embodiment of the invention the supply lines are shown at 10, indicated as a source of direct current. The drive motor is essentially a shunt machine having an armature 12 which is connected across the line, suitable switch or other control mechanism 13 being provided either for manual or automatic control as desired. The motor is wound with a main shunt field winding 14 and on the same poles there is wound an auxiliary shunt field winding 16. In the preferred arrangement, the two windings are arranged to act cumulatively with the main winding 14 supplying the major part of the ampere turns required for the operation of the motor, the auxiliary field supplying a minor part thereof. A variable resistor 17 may be incorporated in the circuit of the main field winding if desired to provide for adjusting the ratio between the strength of the main and auxiliary fields.

The rotor of the alternator is shown at 20 and is mechanically driven by the motor in any suitable manner as indicated at 22, being preferably mounted on an extension of the motor shaft. The rotor is provided with slip rings 24 which provide for energizing the field winding thereof, and the high frequency output is generated in the stator winding 26 to which suitable connection is made for the output circuit 28. One of the slip rings 24 is connected to one side of the supply source 10 while the other is connected to the opposite side through auxiliary field winding 16. A variable resistor 30 is connected in parallel with the auxiliary field coil and it will thus be clear that the generator field winding is in series with the parallel-connected auxiliary field 16 and variable resistor 30. Preferably the resistor 30 is in the form of a carbon pile resistor and it will be apparent that changes in resistance thereof by-pass the current around the field winding 16 and will cause a greater or lesser part of the generator field current to flow therethrough, thus controlling the energization of the alternator field in inverse relation with respect to control of the auxiliary motor field.

Means are provided for deriving a control characteristic proportional to the output voltage of the generator. For this purpose a rectifier 35 preferably of the dry contact type is connected across the output circuit 28 of the generator from which there is derived a direct current potential which is in direct proportion to the generated voltage. This potential is utilized to energize solenoid 36 which develops a tractive force upon its armature, this force being applied through a suitable lever or other means 37 in opposition to the action of a spring 38, the resultant of such opposed forces being applied to the carbon pile to control and regulate its operation.

Operation of this system is as follows: Assuming an increase in the load on the generator, there is a tendency for the generator to slow down with an accompanying reduction in generated voltage. The voltage applied to solenoid 36 will be correspondingly reduced and this will permit spring 37 to increase the pressure on the pile, reducing the resistance thereof. This drop in resistance causes a greater part of the current to pass through the resistor, weakening the auxiliary field 16 and hence reducing the total field excitation on the drive motor. This causes the motor to speed up and to maintain operation within relatively close limits of its initial speed so that the desired frequency is maintained. Such increase in speed also results in an increase in the generated voltage of the generator. There is likewise a relatively small increase in th current flow through the generator field winding as a result of the reduced resistance of the parallel circuit, and this increase in generator excitation tends to likewise increase the generator voltage to the extent required to compensate for additional losses imposed by the increased load, thereby maintaining the generated voltage also within proper limits. The fields of both the motor and generator are preferably operated below saturation and in a range where the field strength will be responsive to small changes in magneto-motive force. Upon a reduction of load, the reverse operations take place resulting in proper control and regulation of both generated frequency and voltage.

In case the voltage of the supply source decreases, the speed of the motor and hence the frequency and voltage of the generator tend to drop. As before the voltage applied to solenoid 36 is reduced with the result that the spring applies more pressure to the carbon pile 30, reducing its resistance and by-passing an additional part of the current so that the field excitation of the drive motor is reduced. This tends to speed up the drive motor with resulting increase and restoration of both the frequency and voltage of the generator to approximately the original conditions and within the desired limits. Such regulating action continues until the proper voltage is obtained across the solenoid to balance the spring pressure at the proper level where equilibrium is achieved. The system is thus self-governing and in operation has been found to be highly effective and free from hunting difficulties.

A modified arrangement is shown in Fig. 2 in which the same reference characters designate corresponding parts. In this arrangement it will be noted that the field 20 of the generator is likewise connected to be energized in series relation with the auxiliary shunt field winding 16 of the motor. However, the variable resistor 30 in this arrangement is connected in parallel with the generator field winding 20 rather than in parallel with the motor field winding 16. Further the action of solenoid 36 and spring 38 is reversed, in that the solenoid now provides for applying the force in the direction to cause application of pressure to the resistor 30, being opposed in that respect by spring 38.

The operation of this arrangement is as follows: Upon increased load on the generator with accompanying drop in its speed and output voltage, the voltage applied to solenoid 36 is reduced, thus applying less pressure to resistor 30 and increasing the resistance thereof. This increased resistance reduces the current flow through the auxiliary field winding of the motor, weakening the motor field and thus restoring the motor speed to substantially its normal condition. Increase in speed causes an increase in the generated voltage, and there is a further increase in the current flow through the generator field winding as a result of the shifting of more of the current from resistor 30 to the generator field. This further increases the generator voltage to maintain the same substantially normal or within the predetermined desired limits. It will thus be observed that the single control operation in this modification affects the fields of the motor and generator inversely with respect to each other, as is the case with the modification described above, and that through this control, regulation of the generated voltage, and the speed of operation of the generator, and hence the frequency in the case of an alternator, are secured.

As a specific example, a regulator system of this character has been operated from a 24 volt source of direct current supply such as the source available on aircraft power plants. The main field coil was constructed to supply from about 60% to 90% of the ampere turns required for operation of the motor, the auxiliary coil supplying the remaining 10% to 40%, depending upon the machine constants and particular operating conditions. The generator output was rated at 115 volts and 400 cycles per second. Through the operation of this control it was possible under change of load from full load to no load and with voltage fluctuations from 22 to 30 volts, to maintain the generated voltage and frequency both well within the specified limits of ±2½% and ±5% respectively.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A control system of the character described which comprises a drive motor adapted to be energized from a source of direct current, said motor having main and auxiliary shunt field windings, an alternator driven by said motor, said alternator having a field winding adapted to be energized from said source and connected in series with said auxiliary motor field, a variable resistor connected in parallel with one of said series connected field windings for effecting control thereof in inverse relation to each other, means for deriving a characteristic responsive to the voltage generated by said alternator, and means controlled by said characteristic for effecting variation of said variable resistor to regulate the output voltage of said alternator.

2. A control system of the character described which comprises a drive motor adapted to be energized from a source of direct current, said motor having main and auxiliary shunt field windings, an alternator driven by said motor, said alternator having a field winding adapted to be energized from said source and connected in series with said auxiliary shunt field winding, carbon pile resistor means, means for connecting said resistor means in circuit for controlling the auxiliary field winding of said motor and for controlling said alternator field winding in inverse relation with respect to said auxiliary shunt field winding, means for deriving a characteristic responsive to the voltage generated by said alternator, and means controlled by said characteristic for effecting variation of said carbon pile to provide reduction in the field of said motor and increase in the field of said alternator upon decrease in the generated voltage of said alternator to maintain said generated voltage within predetermined limits.

3. A control system of the character described which comprises a drive motor adapted to be energized from a source of direct current, said motor having main and auxiliary shunt field windings, a generator driven by said motor, said generator having a field winding adapted to be energized from said source and connected in series with said auxiliary shunt field winding, a variable resistor in parallel with the auxiliary field winding of said motor, means for including said auxiliary field winding and said resistor in the energizing circuit of said generator field winding, means for deriving a characteristic responsive to the voltage generated by said generator, and means controlled by said characteristic for effecting variation of said resistor in the same sense as variations of generated voltage to regulate the output voltage and frequency of said generator.

4. A control system of the character described which comprises a drive motor adapted to be energized from a source of direct current, said motor having main and auxiliary shunt field windings, a generator driven by said motor, said generator having a field winding adapted to be energized from said source and connected in series with said auxiliary shunt field winding, a variable reresistor in parallel with the field of said generator, means for including said generator field winding and said resistor in the energizing circuit of said auxiliary field winding, means for deriving a characteristic responsive to the voltage generated by said generator, and means controlled by said characteristic for effecting variation of said resistor in the same sense as variations of generated voltage to regulate the output voltage and frequency of said generator.

5. A control system of the character described which comprises a drive motor adapted to be energized from a source of direct current, said motor having a main shunt field winding providing approximately 60% to 90% of the required motor field and an auxiliary shunt field winding providing the remainder of the motor field, an alternator driven by said motor, said alternator having a field winding adapted to be energized from said source and connected in series with the auxiliary field winding of said motor, a variable resistor, means for connecting said variable resistor in parallel with one of said series connected field windings, means responsive to the voltage generated by said alternator, and means controlled by said voltage responsive means for effecting variation of said resistor in response to variations of generated voltage to provide control of the output of said alternator.

6. A control system of the character described which comprises a drive motor adapted to be energized from a source of direct current, said motor having a main shunt field winding providing approximately 60% to 90% of the required motor field and an auxiliary shunt field winding providing the remainder of the motor field, an alternator driven by said motor, said alternator having a field winding adapted to be energized from said source and connected in series with the auxiliary field winding of said motor, a carbon pile resistor, means for including said resistor in parallel with one of said series connected field windings, a rectifier for producing a direct current potential proportional to the voltage of said alternator, and means controlled in response to said direct current potential for effecting variation in the pressure applied to said carbon pile in relation to the voltage of said alternator to provide control of the speed of said drive motor and of the output of said alternator.

THOMAS W. MOORE.